US006975619B1

(12) United States Patent
Byers et al.

(10) Patent No.: US 6,975,619 B1
(45) Date of Patent: Dec. 13, 2005

(54) SYSTEM AND METHOD FOR PROVIDING HOST GEOGRAPHIC LOCATION INFORMATION IN A PACKET DATA NETWORK

(75) Inventors: Charles Calvin Byers, Aurora, IL (US); James Patrick Dunn, Northville Township, Lasalle County, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/528,572

(22) Filed: Mar. 20, 2000

(51) Int. Cl.[7] .............................................. H04L 12/28
(52) U.S. Cl. ....................... 370/351; 370/352; 370/400
(58) Field of Search ................................ 370/352–356, 370/328, 465, 320, 312, 351, 254, 400, 401, 370/310, 338, 349, 389, 392; 455/445, 422, 455/456

(56) References Cited

U.S. PATENT DOCUMENTS

| 5,659,544 A | * | 8/1997 | La Porta et al. ............ 370/312 |
| 5,727,057 A | * | 3/1998 | Emery et al. ........... 379/201.07 |
| 5,845,203 A | * | 12/1998 | LaDue ..................... 455/414.1 |
| 6,081,715 A | * | 6/2000 | La Porta et al. ............. 455/445 |
| 6,185,427 B1 | * | 2/2001 | Krasner et al. ........... 455/456.2 |
| 6,359,880 B1 | * | 3/2002 | Curry et al. ................. 370/352 |
| 6,366,568 B1 | * | 4/2002 | Bolgiano et al. ............ 370/320 |
| 6,501,767 B1 | * | 12/2002 | Inoue et al. ................. 370/465 |
| 6,636,502 B1 | * | 10/2003 | Lager et al. ................. 370/352 |
| 6,838,998 B1 | * | 1/2005 | Brown et al. ........... 340/825.49 |
| 2002/0131393 A1 | * | 9/2002 | Baldridge |
| 2002/0171581 A1 | * | 11/2002 | Sheynblat et al. |

* cited by examiner

Primary Examiner—Ajit Patel

(57) ABSTRACT

A geographic location identification system and method for a packet data network is disclosed wherein geographic location information is provisioned or derived at nodes that comprise the network. Upon a request from a requesting node, the geographic location information of one or more target nodes is provided to the requesting node. The target nodes may be user access nodes and/or network routing nodes.

33 Claims, 5 Drawing Sheets

SYSTEM AND METHOD FOR PROVIDING HOST GEOGRAPHIC LOCATION INFORMATION IN A PACKET DATA NETWORK

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to packet data networks. More particularly, the invention concerns the determination of network node geographic location information by an inquiring network device.

2. Description of the Prior Art

In a conventional circuit switched network, such as the Public Switched Telephone Network (PSTN), identification systems are in place that provide caller geographic location information to called parties. This service has a variety of uses. For example, when a caller dials the "911" emergency response number, automatic provision of the caller's geographic location allows the emergency response center to provide lifeline service in the event that the caller is unable to speak or becomes incapacitated prior to verbally describing their location. It also improves emergency vehicle navigation and response time.

With packet data networks now being used for voice telephony applications, it would be desirable to implement a caller location feature that advises a called party of a calling party's geographic location in the network. In addition to voice telephony applications, geographic location information could be used to advantage by network authentication servers to verify the identity of transacting parties. Network management servers could also use geographic location information to develop network topology maps that provide a visual representation of network resources. At present there is no known system for acquiring geographic location information relative to communicating nodes in a packet data network.

SUMMARY OF THE INVENTION

The foregoing problems are solved and an advance in the art is obtained by a novel host geographic location identification system and method for packet data networks. In accordance with the disclosed system and method, host geographic location information is provisioned at, or can be derived by, network nodes that comprise the packet data network. More particularly, each network node stores, or has the ability to determine (e.g., using a GPS (Global Positioning System) device), its own geographic location information. In response to a request from a requesting node in the packet data network, the geographic location information of a target node is provided to the requesting node. A software application operating at the requesting node can then process the geographic location information to perform higher level functions.

In one exemplary embodiment of the invention, the requesting node serves a called party in a packet telephony session and the target node serves the calling party. The requesting node implements an emergency response telephony server application that uses the geographic location information to locate the calling party. In another exemplary embodiment of the invention, the requesting node implements a data network authentication server and the target node is a network host operated by an entity providing identification information to the authentication server. The geographic location information is used to verify the identification information. In still another exemplary embodiment of the invention, the requesting node implements a data network management server and the target node is one of multiple nodes in the network. The network management server uses the geographic location information to develop a network topology map that can be used for network load balancing or the like.

The network nodes from which geographic location information is obtained may include network routing nodes and user access nodes. The geographic location information may include latitude, longitude and altitude. Alternatively, or additionally, the geographic location information may include address information, including if necessary, floor and suite information. Each network node in a routing pathway between a requesting node and a target node can also provide geographic location information to the requesting node. This can act as a check on the validity of geographic location information provided by the target node in order to prevent spoofing and the like.

Several mechanisms can be employed to obtain geographic location information from the target node. In a preferred implementation, the requesting node sends traceback packets designed to elicit geographic location information from the target node and from each network node in the routing pathway between these two end points. The geographic location information is provided in response packets sent back to the requesting node. If the invention is implemented in an IP (Internet Protocol) network, the traceback packets could be implemented as network layer traceroute packets by extending the ICMP (Internet Message Control Protocol) to provide for the incorporation of geographic location information fields in ICMP response packets. If the geographic location information of intermediate network nodes is not required, a modification of the ICMP echo request ("ping") protocol could be used in which the ICMP protocol is extended to provide for the incorporation of geographic location information fields in ICMP echo response packets.

If the invention is implemented in an ATM (Asynchronous Transfer Mode) network, the traceback packets could be implemented as link layer traceback packets by extending the ATM messaging protocol to include the incorporation of geographic location information fields in VP (Virtual Path)/VC (Virtual Connection) setup messages, traffic management messages, or the like. If the invention is implemented in an Ethernet network, the traceback packets could be implemented as link layer traceback packets by extending the MAC (Media Access Control) Address Resolution Protocol (ARP) to include the incorporation of geographic location information fields in ARP response packets. In still another implementation, the target node may have a dial-up connection to the packet data network via a local telephone network and a Remote Access Server (RAS). In that case, geographic location information maintained by the telephone network could be provided to a requesting node in the packet data network via the RAS.

BRIEF DESCRIPTION OF THE DRAWING

The foregoing and other features and advantages of the invention will be apparent from the following more particular description of preferred embodiments of the invention, as illustrated in the accompanying Drawing, in which.

DETAILED DESCRIPTION OF THE PREFERRED EMBODIMENT

Figure 1:
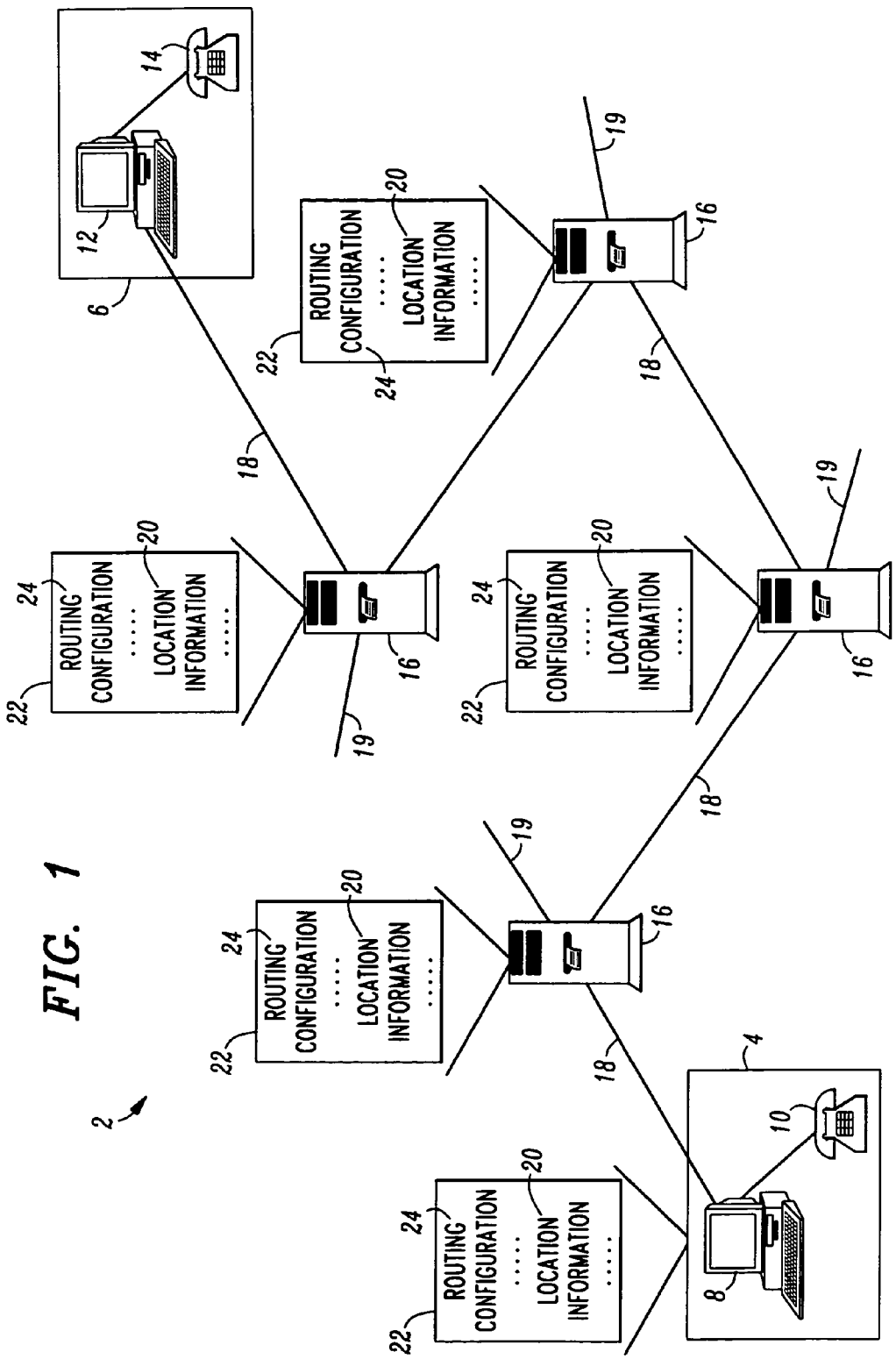
FIG. 1 is a block diagram showing relevant portions of an exemplary packet data network constructed in accordance with the invention.

Turning now to the figures, wherein like reference numerals represent like elements in all of the several views, FIG. 1 illustrates an exemplary packet data network 2 providing support for packet data communication between network nodes (also known as "hosts") 4 and 6. The packet data network 2 could be any conventional packet data network or inter-network, such as a private LAN (Local Area Network) or WAN (Wide Area Network), or the public Internet.

The network node 4 includes a data terminal 8 (such as a personal computer) and an optional telephony device 10. The network node 6 is similarly configured with a data terminal 12 and an optional telephony device 14. The data terminals 8 and 12 are both connected to the packet data network 2 using conventional physical and link layer resources, such as Ethernet over copper wire, ATM over fiber optic cabling, xDSL, or the like. A wireless access network could also be used if either of the network nodes 4 and 6 is implemented as a mobile network node.

The packet data network 2 is assumed for purposes of illustration to route data traffic using a network layer protocol such as IP and transport layer protocols such as TCP/IP and UDP. The packet data network 2 includes plural routers 16, representing routing nodes, that route data packets between the network nodes 4 and 6, which represent user access nodes. Each router connects to one or more other routers via conventional data links 18. For convenience, only the routers 16 and the links 18 that form one exemplary routing pathway between the user access nodes 4 and 6 are illustrated in FIG. 1. It will be understood, however, that in an actual network, each router 16 would typically connect to other routers along pathways such as those indicated by the partially shown links 19.

In accordance with the geographic location identification system and method of the invention, geographic location information 20 is provisioned at, or can be derived by, each network node that comprises the packet data network 2. This includes the routing nodes 16 and the user access nodes 4 and 6. To derive geographic location information at a network node in lieu of provisioning such information, a GPS device (not shown) may be used. This would be especially useful for mobile nodes (e.g., cellular telephone data terminals) or portable nodes (e.g., laptop computers) that frequently change their geographic location and point of attachment to the packet data network 2. The geographic location information 20 identifies the geographic location of the node at which it is provisioned or derived. This information may include latitude, longitude and altitude, and/or address information such as Country, State, City, Street and Floor or Suite number. If the geographic location information is provisioned, it can be maintained in the usual data store 22 that holds routing tables, host identification tables, and other network-related information 24.

Each node of the packet data network 2 is preferably configured to provide its geographic location information to any other node in the network. Each node may thus act as a target node relative to a requesting node seeking geographic location information. A requesting node is a node running a requesting application that make use of the geographic location information provided by target nodes to perform higher level functions. Several exemplary requesting applications are described in more detail below with reference to FIGS. 3, 4 and 5. To prevent geographic location spoofing by invalid target nodes, non-geographic-location based authentication and encryption protections may be implemented using conventional techniques. In addition, or in the alternative, geographic location verification can be performed by eliciting geographic information from intermediate routing nodes between a requesting node and a target node. This information can be compared against an existing database of host-to-host geographic location relationships or evaluated dynamically based on host-to-host geographic relationship rules.

A requesting node may send a geographic location information request to a target node in several ways. For example, the requesting node can send traceback packets designed to elicit response packets containing geographic location information from the target node. The traceback packets would also elicit a geographic location response from intermediate routing nodes along the communication path between the requesting node and the target node. As mentioned above, this would provide a measure of anti-spoofing protection. If the invention is implemented in an IP network, the traceback packets could be implemented as network layer traceroute packets by extending the ICMP (Internet Message Control Protocol) to provide for the incorporation of geographic location information fields in ICMP response packets. Using conventional traceroute processing, the Time_To_Live (TTL) fields of successively-sent traceroute packets could be set to elicit an ICMP response from each network node in the communication path between the requesting node and the target node. By adding geographic location information fields to the ICMP packets sent in response to a TTL timeout condition, the requesting node would obtain the desired geographic location information from each node's ICMP response.

If the geographic location of intermediate network nodes is not required, the invention could be implemented using a modified version of the ICMP echo_request protocol. According to this option, the requesting node would send ICMP echo_request packets to the target node. These echo_request packets would elicit an ICMP echo_response from the target node, prompting it to return an echo_response packet. By extending the ICMP protocol to provide for the incorporation of geographic location information fields in ICMP echo_response packets, the requesting node would obtain the desired geographic location information of the target node from the target node's ICMP response.

In a similar vein, if the invention is implemented in an ATM (Asynchronous Transfer Mode) network, the traceback packets could be implemented as link layer traceback packets by extending the ATM messaging protocol to add geographic location information fields to selected VP/VC (Virtual Path/Virtual Channel) setup messages, traffic management messages, or the like. If the invention is implemented in an Ethernet network, the traceback packets could be implemented as link layer traceback packets by extending the MAC (Media Access Control) Address Resolution Protocol (ARP) to add geographic location information fields to ARP response packets.

Figure 2:
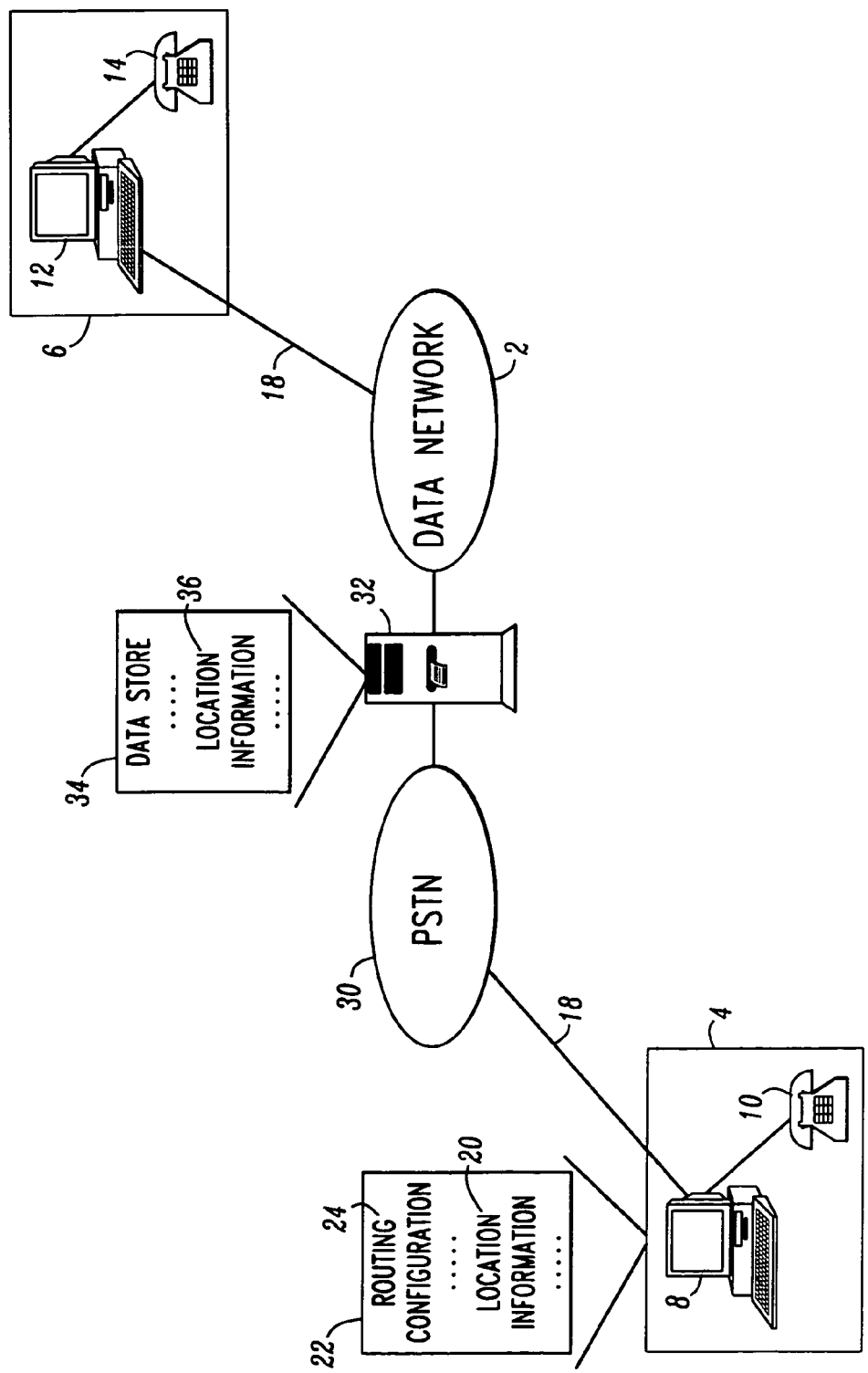
FIG. 2 is a block diagram showing a dial-up network node connected through a telephone network and a remote access server to the packet data network of FIG. 1.

In a still further implementation of the invention, shown in FIG. 2, the target node (4) may have a dial-up connection to the packet data network 2 through a local telephone network 30 and a RAS (Remote Access Server) 32. In that case, the caller identification information relative to the target node 4 could be provided by the telephone network 30 to the RAS 32, which would store the information in a data store 34 containing geographic location information 36 for multiple dial-up nodes. This information would be provided by the RAS 32 in response to a geographic location request sent from a requesting node to the target node. The response from the RAS 32 could be a supplementation of a geographic location response from the target node, thus serving to verify the target node response, or the RAS response could be provided in lieu of a response from the target node. To provide maximum security, a consistency check could be made between the geographic location information 20 provided by the target node 4, the geographic location information 36 provided by the RAS 32, and the geographic location information provided by the telephone network 30.

Figure 3:
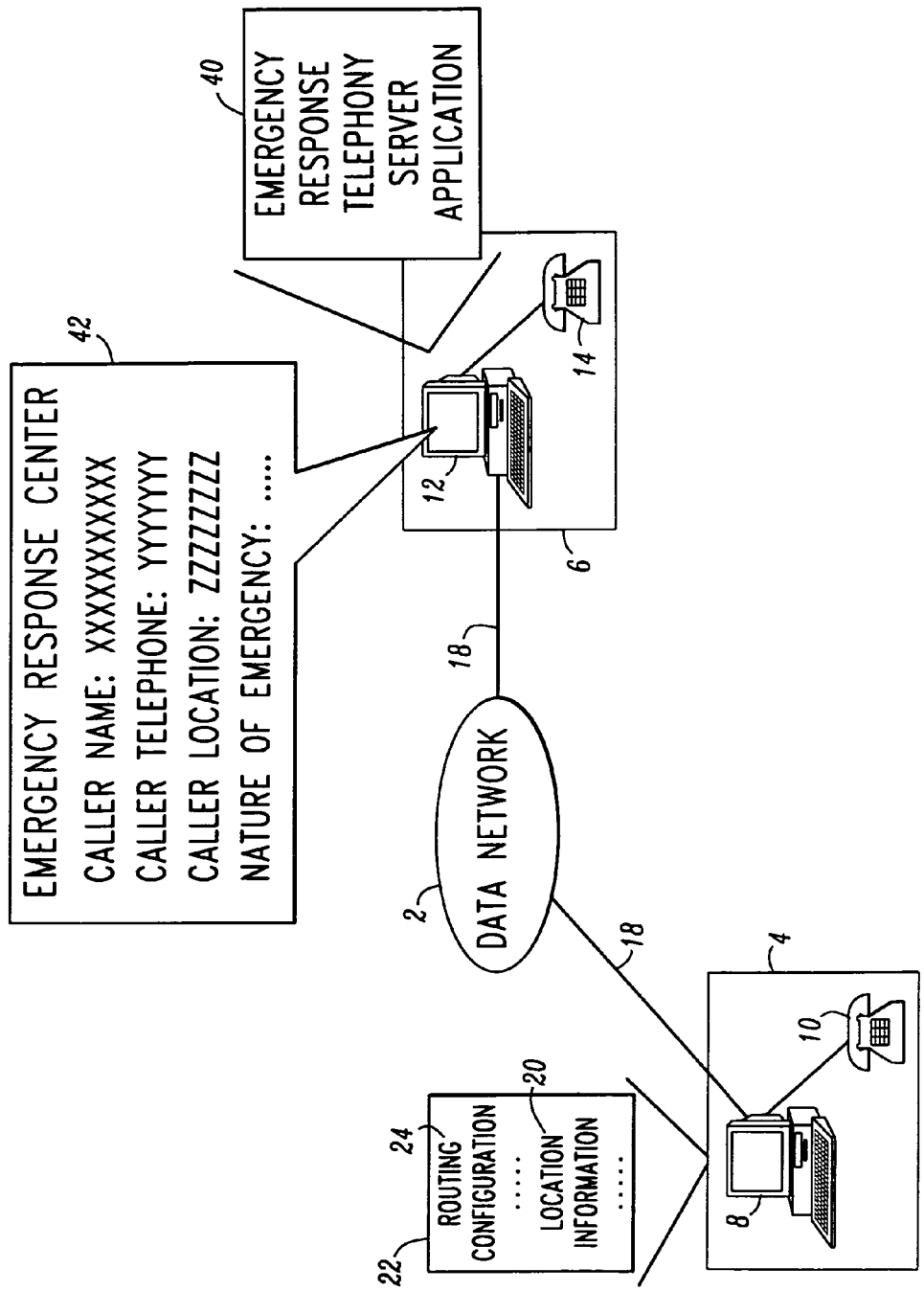
FIG. 3 is a block diagram showing a graphical user interface for a high level application utilizing geographic location information at a packet data network-connected emergency response facility.
Figure 4:
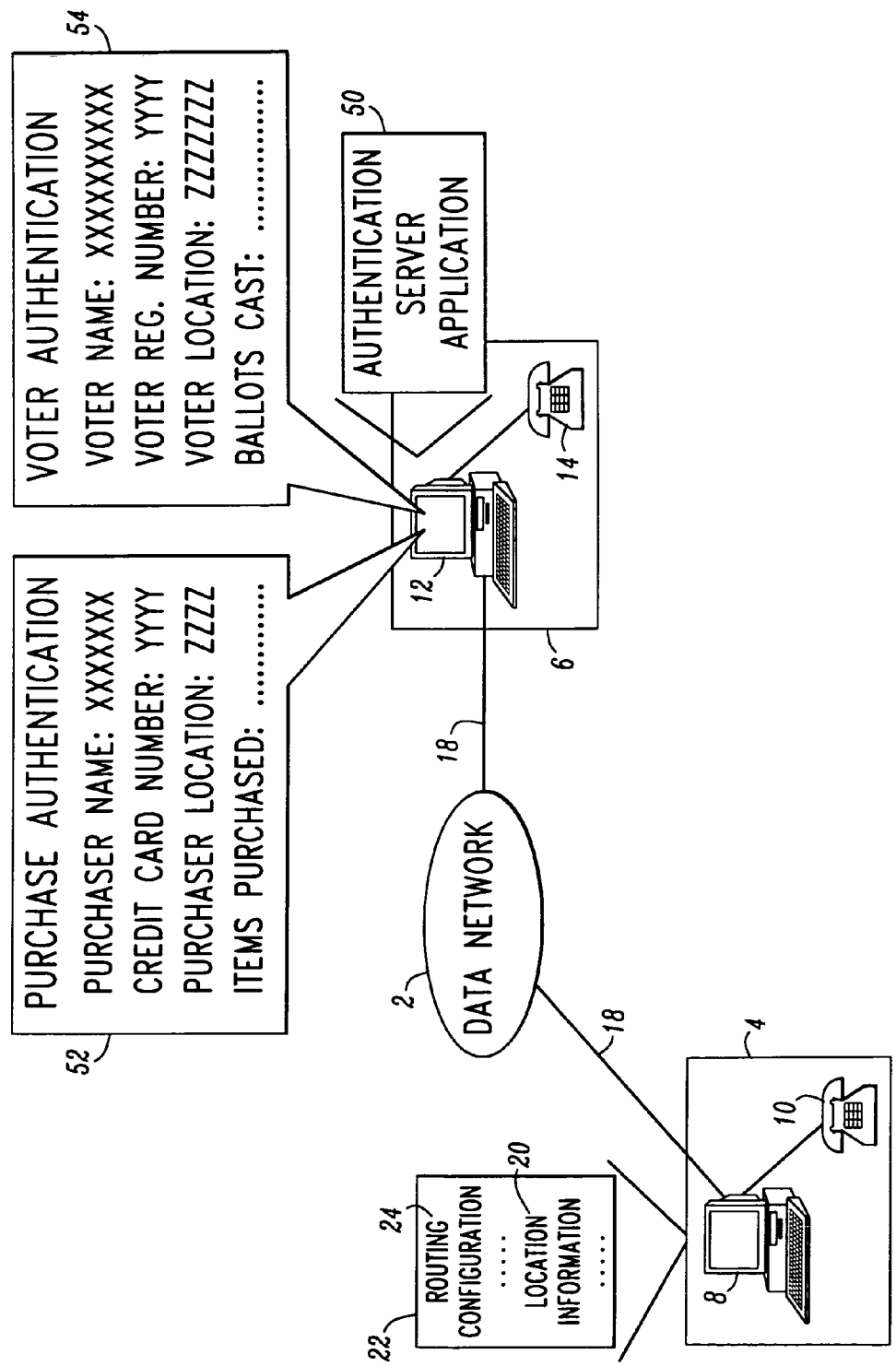
FIG. 4 is a block diagram showing a graphical user interface for a high level application utilizing geographic location information in a packet data network-connected authentication server.
Figure 5:
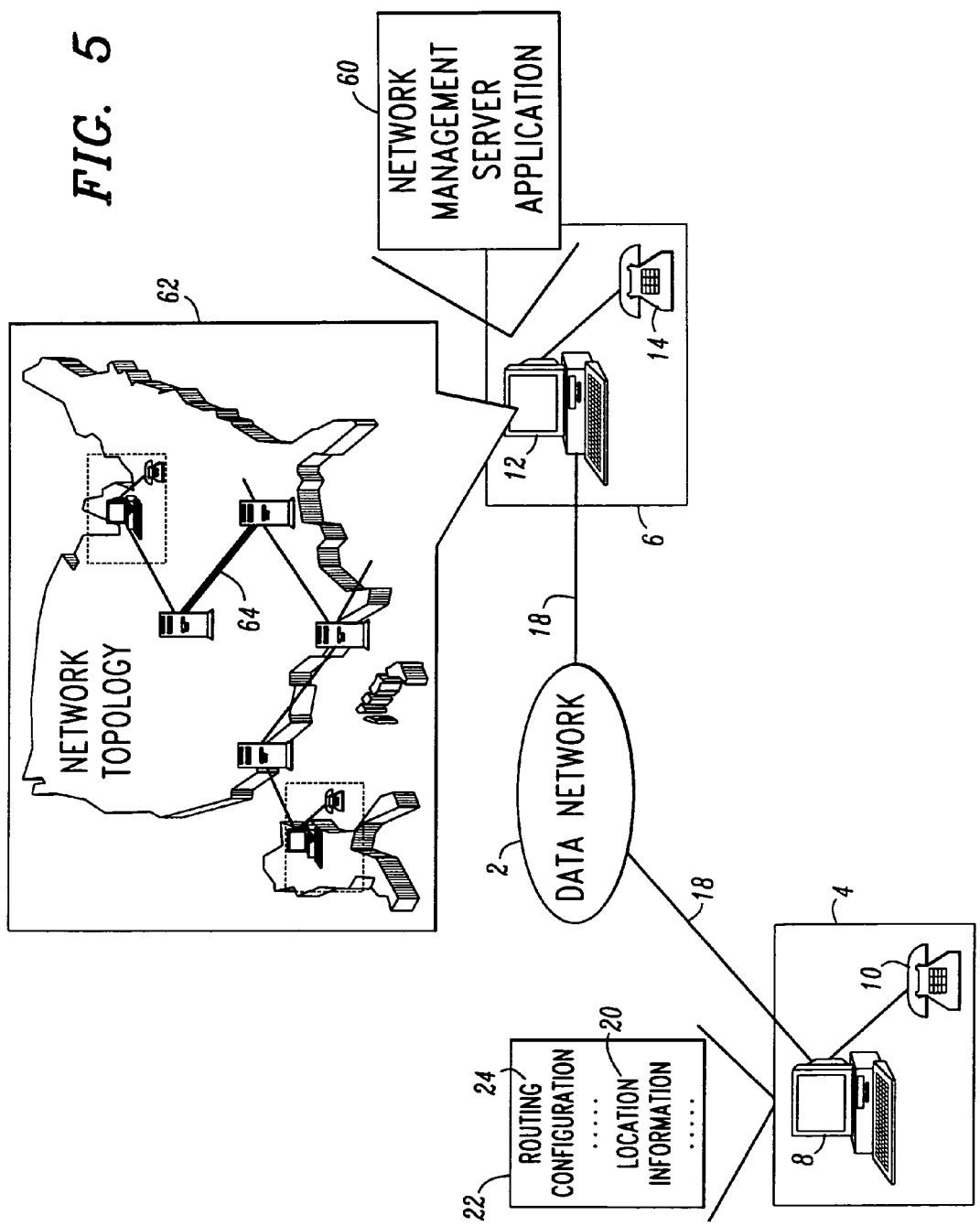
FIG. 5 is a block diagram showing a graphical user interface for a high-level application utilizing geographic location information in a packet data network-connected network management server.

FIGS. 3, 4 and 5 illustrate exemplary embodiments of the invention in which the network node 6 is a requesting node running a requesting application. In FIGS. 3 and 4, the network node 4 is a target node. In FIG. 4, all of the nodes in the packet data network 2 are target nodes.

FIG. 3 represents an embodiment of the invention wherein the target node 4 and the requesting node 6 are engaged in a packet telephony communication session. The data terminal 8 and telephony device 10 serve the calling party and the data terminal 12 and telephony device 14 serve the called party. The called party, moreover, is an emergency response center running an emergency response telephony server application 40. When the calling party initiates the communication session, the emergency response application 40 causes the data terminal 12 to send a geographic location request to the target node 4. The data terminal 12 sends the request using one of the methods described above and the data terminal 8 responds accordingly. The geographic location information provided in the response is passed to the emergency response application 40, which processes the information and displays it on a graphical user interface 42. Thus, as the calling party converses with the called party, the called party can determine the calling party's geographic location from the interface 42, and use it to dispatch an emergency response vehicle.

FIG. 4 represents an embodiment of the invention wherein the target node 4 and the requesting node 6 are engaged in a packet data communication session. In particular, the data terminal 8 serves an information providing entity, such as an online purchaser attempting to make an online purchase, and the data terminal 12 serves an authenticating entity, such as an online merchandising system seeking to verify identification information from a purchaser. Alternatively, the data terminal 8 could serve an online voter desiring to cast an electronic vote for a political candidate, and the data terminal 12 could serve an online electronic voting system. In either case, the information providing entity provides identification information to an authentication server application 50 running on the data terminal 12. The authentication server application 50 causes the data terminal 12 to send a geographic location request to the target node 4. The data terminal 12 sends the request using one of the methods described above and the data terminal 8 responds accordingly. Preferably, however, in order to minimize the possibility of geographic location spoofing, the traceback method is used so that the geographic location information of intermediate routing nodes is elicited and appropriately verified. The geographic location information provided in the response is passed to the authentication server application 50, which processes the information and may also display it on a graphical user interface 52 (for online purchasing) or a graphical user interface 54 (for online electronic voting), if an employee of the authentication entity is assisting the transaction. Thus, as the information providing entity communicates the identification information, it can be verified against the geographic location information provided by the target node 4.

FIG. 5 represents an embodiment of the invention wherein the requesting node 6 queries a group of nodes (including node 4) of the packet data network 2. The data terminal 12 runs a network manager server application 60 that is used by a network administrator. The network manager application implements a graphical user interface 62 that displays network topology information which the network administrator uses to perform network load balancing or make determinations about the deployment of additional network resources. To generate the topology graphics, the network manager server application 60 causes the data terminal 12 to send a geographic location request to the appropriate target nodes. The data terminal 12 sends the request using one of the methods described above and the target nodes respond accordingly. The geographic location information provided in the responses is passed to the network management server application 60, which processes the information and displays it on the graphical user interface 62. Thus, the network administrator is provided with accurate information about the topology of the packet data network 2. This can help the network administrator visualize network problems. By way of example, the geographic location of a heavily congested link 64 in the packet data network 2 is shown, allowing the network administrator to visually identify hosts that may be affected by the congestion and to select alternate routing pathways.

Accordingly, a packet data network geographic location identification system and method have been described. While various embodiments have been disclosed, it should be apparent that many variations and alternative embodiments could be implemented in light of the disclosure herein. It is understood, therefore, that the invention is not to be in any way limited except in accordance with the spirit of the appended claims and their equivalents.

What is claimed is:

1. A packet data network geographic location identification method, comprising the steps of:
   generating a request for geographic location information at a requesting node that is adapted to consume said geographic location information;
   sending said request to a target node that provisions or derives node geographic location information about itself;
   providing said node geographic location information to said requesting node;

said request being sent to said target node through one or more intermediate routing nodes that provision or derive node geographic location information about themselves; and said intermediate routing nodes providing their geographic location information to said requesting mode.

2. A method in accordance with claim 1 wherein said requesting node implements a packet telephony server that uses said geographic location information to identify the geographic location of a calling party served by said target node.

3. A method in accordance with claim 2 wherein said packet telephony server is an emergency response telephony server.

4. A method in accordance with claim 1 wherein said requesting node implements an authentication server that uses said geographic location information to verify identification information of an entity served by said target node.

5. A method in accordance with claim 4 wherein said authentication server is part of an online merchandising system.

6. A method in accordance with claim 4 wherein said authentication server is part of an online electronic voting system.

7. A method in accordance with claim 1 wherein said requesting node implements a network management server that uses said geographic location information to generate a network topology map showing the geographic location said target node.

8. A method in accordance with claim 1 wherein said target node is a user access node.

9. A method in accordance with claim 1 wherein said target node is a network routing node.

10. A method in accordance with claim 1 wherein said geographic location information includes latitude, longitude and altitude.

11. A method in accordance with claim 1 wherein said geographic location information includes Country, State, City, Street, and Floor or Suite information.

12. A method in accordance with claim 1 wherein said generating and sending steps include generating and sending traceback packets to said target node by way of said intermediate routing nodes that provision or derive geographic location information about themselves.

13. A method in accordance with claim 12 wherein said providing step includes sending response packets containing said geographic location information about said target node and said intermediate routing nodes in response to said traceback packets.

14. A packet data network geographic location identification system, comprising:

means in a requesting node for generating a request for geographic location information;

means in said requesting node for sending said request to a target node that provisions or derives node geographic location information about itself;

means in said target node for providing said node geographic location information to said requesting node;

means in said requesting node for consuming said node geographic information;

said sending means being adapted to send said request to said target node through one or more intermediate routing nodes that provision or derive node geographic location information about themselves; and said system including means in said intermediate routing nodes for providing their geographic location information to said requesting node.

15. A system in accordance with claim 14 wherein said requesting node implements a packet telephony server that uses said geographic location information to identify the geographic location of a calling party served by said target node.

16. A system in accordance with claim 15 wherein said packet telephony server is an emergency response telephony server.

17. A system in accordance with claim 14 wherein said requesting node implements an authentication server that uses said geographic location information to verify identification information of an entity served by said target node.

18. A system in accordance with claim 17 wherein said authentication server is part of an online merchandising system.

19. A system in accordance with claim 18 wherein said authentication server is part of an online electronic voting system.

20. A system in accordance with claim 14 wherein said requesting node implements a network management server that uses said geographic location information to generate a network topology map showing the geographic location said target node.

21. A system in accordance with claim 14 wherein said target node is a user access node.

22. A system in accordance with claim 14 wherein said target node is a network routing node.

23. A system in accordance with claim 14 wherein said geographic location information includes latitude, longitude and altitude.

24. A system in accordance with claim 14 wherein said geographic location information includes Country, State; City, Street, and Floor or Suite information.

25. A system in accordance with claim 14 wherein said generating means and said sending means respectively generate and send traceback packets to said target node by way of said intermediate routing nodes that provision or derive geographic location information about themselves.

26. A system in accordance with claim 25 wherein said providing means sends response packets containing said geographic location information about said target node and said intermediate routing nodes in response to said traceback packets.

27. In a packet telephony network, a method for providing caller geographic location identification service, comprising the steps of:

provisioning or deriving geographic location information at network nodes that comprise the packet telephony network such that each network node provisions or derives geographic location information about itself;

providing said geographic location information to a requesting node in said packet telephony network;

processing said geographic location information at said requesting node to determine the geographic location of a node to be located in said packet telephony network; and said requesting node serving a called party in a packet telephony session and said node to be located serving a calling party in said packet telephony session.

28. A method in accordance with claim 27 wherein said requesting node implements an emergency response server.

29. In a packet data network, a method for authenticating identification information provided by remote entity, comprising the steps of:

provisioning or deriving geographic location information at network nodes that comprise the packet data network such that each network node provisions or derives geographic location information about itself;

providing said geographic location information to a requesting node in said packet data network;

processing said geographic location information at said requesting node to determine the geographic location of a node to be located in said packet data network; and said requesting node serving on authenticating entity in a packet data session and said node to he located serving un information providing entity in said packet data session.

30. A method in accordance with claim 29 wherein said authentication server is part of an online merchandising system.

31. A method to accordance with claim 29 wherein said authentication server is part of an online electronic voting system.

32. In a packet data network, a method for managing said network, comprising the steps of:

provisioning or deriving geographic location information at network nodes that comprise the packet data network such that each network node provisions or derives geographic location information about itself;

providing said geographic location information to a requesting node in said packet data network;

processing said geographic location information at said requesting node to determine the geographic location of nodes to be located in said packet data network; and said requesting node serving a network management entity.

33. A method in accordance with claim 29 wherein said processing step includes generating a network topology map.

* * * * *